(12) United States Patent
Chamberlain et al.

(10) Patent No.: US 6,377,755 B1
(45) Date of Patent: Apr. 23, 2002

(54) THERMALLY PROTECTIVE CAMERA CASE

(75) Inventors: Frederick R. Chamberlain, Leucadia, CA (US); John A. Agostinelli; Henry J. Gysling, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/992,051

(22) Filed: Dec. 17, 1997

(51) Int. Cl.[7] .............................................. G03B 17/00
(52) U.S. Cl. ...................... 396/429; 396/661; 62/457.1; 62/457.9
(58) Field of Search .................. 396/429, 534, 396/535, 661; 62/457.1, 457.2, 457.3, 457.7, 457.8, 457.9

(56) References Cited

U.S. PATENT DOCUMENTS

| | | | |
|---|---|---|---|
| 3,255,607 A | | 6/1966 | Bair et al. |
| 3,289,557 A | * | 12/1966 | Garcia et al. ............... 396/429 |
| 3,951,127 A | | 4/1976 | Watson et al. |
| 3,999,048 A | | 12/1976 | Parthemore |
| 4,019,340 A | | 4/1977 | Conklin |
| 4,077,390 A | | 3/1978 | Stanley et al. |
| 4,322,954 A | | 4/1982 | Sheehan et al. |
| 4,581,285 A | | 4/1986 | Mahefkey, Jr. |
| 4,797,160 A | * | 1/1989 | Salyer ......................... 106/96 |
| 4,872,442 A | | 10/1989 | Manker |
| 5,096,690 A | | 3/1992 | Saito |
| 5,106,520 A | | 4/1992 | Salyer |
| 5,155,358 A | | 10/1992 | Larson |
| 5,162,906 A | | 11/1992 | Yorita et al. |
| 5,181,394 A | | 1/1993 | Schea, III et al. |
| 5,213,772 A | | 5/1993 | Ichikawa et al. |
| 5,282,994 A | | 2/1994 | Salyer |
| 5,290,904 A | | 3/1994 | Colvin et al. |
| 5,334,359 A | | 8/1994 | Masutomi et al. |
| 5,370,814 A | | 12/1994 | Salyer |
| 5,449,571 A | * | 9/1995 | Longardner et al. ........ 429/120 |
| 5,477,917 A | | 12/1995 | Salyer |
| 5,647,226 A | * | 7/1997 | Scaringe et al. ......... 62/457.02 |
| 5,835,806 A | * | 11/1998 | Kautz .......................... 396/419 |

OTHER PUBLICATIONS

Aldrich Chemical Co. trade literature, Jun. 22, 1994.
Blueprints Services 07200/DOW, pp. 2–11, no date.

* cited by examiner

*Primary Examiner*—David M. Gray
(74) *Attorney, Agent, or Firm*—Paul A. Leipold; Lynne M. Blank

(57) ABSTRACT

The invention relates to an article comprising photographic silver halide film substantially surrounded by a container comprising a phase change material, wherein said container will maintain said film at a temperature of below 130° F.(55° C.) when said container is repeatedly cycled over a 24-hour period reaching 180° F.(82° C.) for four hours.

14 Claims, 4 Drawing Sheets

THERMALLY PROTECTIVE CAMERA CASE

FIELD OF THE INVENTION

The invention relates to a thermally protected case. It particularly relates to a case adapted to protect film during heat cycling in a parked car.

BACKGROUND OF THE INVENTION

It is often desirable to keep a camera in an automobile. Cameras of the single use type may be stored in the car for unexpected picture taking opportunities such as accidents or other unexpected events. Further, point and shoot and SLR cameras are often carried in the car on vacations and for business purposes. The temperature inside a car parked in the sun may raise to quite high temperatures including temperatures of 180° F. (82° C.) and above. Long-term exposure to such temperatures is particularly common in the southwestern U.S., as well as other hot climates. Film is quite subject to deterioration at higher temperatures. Generally, film deterioration is quite rapid at temperatures above 160° F. (70° C.), and any lengthy exposure at temperatures above 130° F. (55° C.) may be harmful. The event is cumulative, meaning that the deterioration of film kept at high temperature or cycled to high temperatures becomes progressively worse with time.

When traveling in an automobile, it is often desirable to have a camera along for taking pictures. However, considerable inconvenience is often incurred in having to take the camera out of the car when parking to prevent the film from being ruined by high temperatures. It would be much more convenient to store the camera in the car, using a simple and inexpensive means to keep the camera and film cool.

The prior art contains several descriptions of methods to provide for cooling of a camera, using active techniques such as circulating air (U.S. Pat. No. 5,155,358) or water (U.S. Pat. No. 5,162,906). These systems are not practical for use in an automobile because of cost, complexity, and limited power available from the battery to run them for an extended period of time. A needed improvement would be a device which provides cooling without any active components, and which requires no external connections or power.

Many portable cooling devices have been disclosed, such as U.S. Pat. No. 4,322,954. All of these have required periodic replenishment of a consumable material such as ice or Freon. It is impractical and inconvenient to have to drain water from and add ice to a camera case. A needed improvement would be a device which does not use consumable materials.

The present invention uses encapsulated phase change material. It is well known to use such materials to provide heat, such as in heat packs used as hand warmers for people outdoors and medical skin warmers. U.S. Pat. Nos. 3,951,127; 4,077,390; and 4,872,442 describe such devices. These devices all use crystallization of material to provide heat, rather than the melting of the material to absorb it and maintain a lower than ambient temperature.

It would also be desirable if it was possible to store other materials in a closed automobile without their deterioration. Typical of such materials would be medical products that might be needed for an emergency or routine medical care which it is desirable to carry in the car. Other uses might be for storage of food products or sensitive electronic equipment.

PROBLEM TO BE SOLVED BY THE INVENTION

A need exists to provide thermal protection for film, cameras, and other temperature sensitive materials stored inside an automobile. Film quality is significantly degraded by exposure to temperatures on the order of 130° F. (55° C.) or higher, while the temperature inside a car parked in the sun can reach over 200° F. (95° C.).

SUMMARY OF THE INVENTION

An object of the invention is to overcome disadvantages of prior methods of forming temperature sensitive materials.

Another object of the invention is the long-term storage of film in an automobile.

A further object of the invention is to provide low cost storage for temperature sensitive films.

These and other objects of the invention generally are accomplished by an article comprising photographic silver halide film substantially surrounded by a container comprising a phase change material, wherein said container will maintain said film at a temperature of below 130° F. (55° C.) when said container is repeatedly cycled over a 24-hour period reaching 180° F. (82° C.) for four hours.

In another embodiment of the invention, there is provided a container comprising an outer thermal insulating shell, a phase change material inside said shell wherein said container will maintain an internal temperature of less than 130° F. (55° C.) when cycled over a 24-hour period including up to four hours at 180° F. (82° C.).

ADVANTAGEOUS EFFECT OF THE INVENTION

The invention provides a low cost means to allow storage of heat sensitive materials in an automobile that is parked in the sun in the daytime and relatively cool at night.

DETAILED DESCRIPTION OF THE INVENTION

There are numerous advantages of the instant invention. The invention allows the storage of a camera in a vehicle such that it is immedately available for use when needed. This is particularly advantageous in the event of an accident or social occasion where a picture would be desirable. The case of the invention is passive not requiring an electrical draw from the car or high cost production. The materials involved are readily available and reliable for cyclical operation. The case of the invention may be made in a size that will readily fit in storage areas in a car. Storage cases of the invention also would allow the storage of materials such as emergency drug supply for heart or asthma patients without their rapid deterioration. Emergency supplies for treatment after wasps or snake bites also could be stored in this case with a longer shelf life than is possible when merely placing the materials in a car. These and other advantages will be apparent from the detailed description below.

Figure 1:
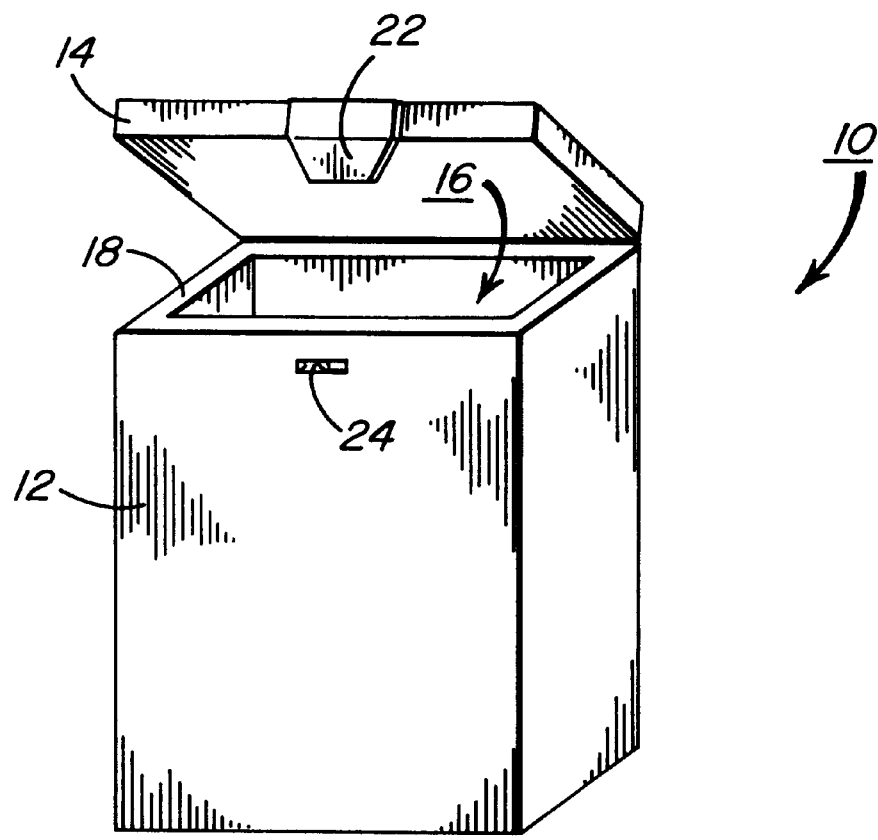
FIG. 1 is a perspective view of the container of the invention.

The case 10 of FIG. 1 is representative of a thermally protected storage container in accordance with the invention. The container has an outer wall 12, storage space 16, and sealing surface 18 for lid 14. The case further is provided with a clasp 22 which fastens onto receiving device 24.

Figure 2:
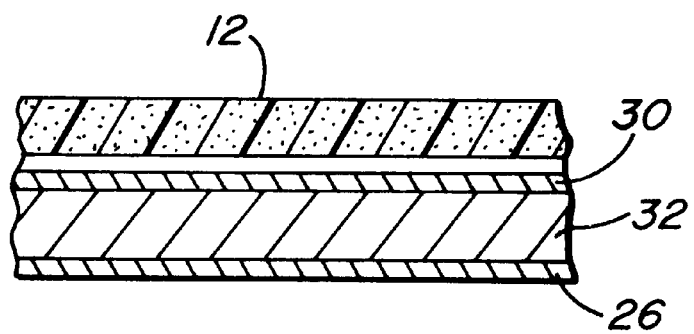
FIG. 2 is a cross section of a section of the wall of a container of the invention.

In FIG. 2 a cross section taken in the wall of container 1. Twelve is the outer layer which is composed of an insulating material such as a polystyrene foam. Phase change material 32 is located within encapsulation sheets 30 and 26.

Figure 7:
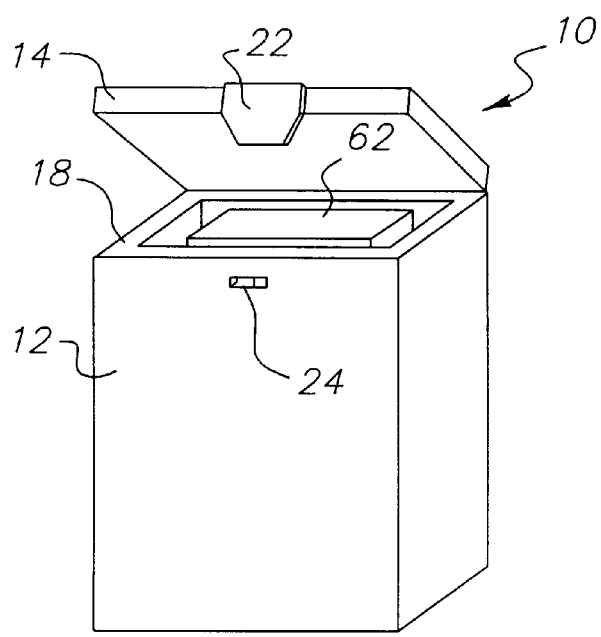
FIG. 7. illustrates a container of the invention containing film.
Figure 8:
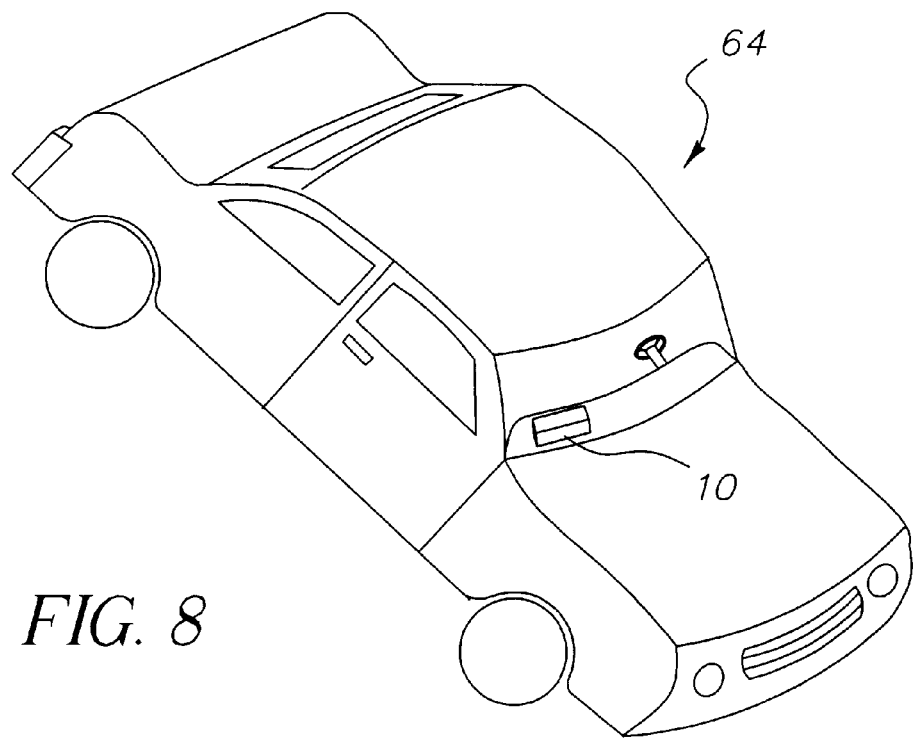
FIG. 8 illustrates the container of the invention in a car.

FIG. 7 illustrates film 62 in the container 10. FIG. 8 illustrates the container 10 containing film that is placed in a car 64 on the dashboard.

While FIG. 2 shows the container of minimal construction components, it is possible that a container could have a protective layer on the outer surface over the foam plastic layer. Further, there could be a separate inner liner that does not form part of the encapsulation of the phase change material. A more sophisticated seal could be present between lid 14 and the sealing surface 18 such as a gasket. The inner and outer surface layers could be formed of plastic or cardboard sheets.

The phase change material should be separated into a multicellular structure such as in a honeycomb in order to prevent its settling to the bottom of the container in the event that the volume becomes less when it's liquified than when solid. The phase change material generally will change from the solid to the liquid phase at a raised temperature, thereby absorbing a great amount of heat and preventing the material stored within the container from reaching a higher temperature. It has been found that color negative film is sensitive to temperature of storage. Samples stored at 120° F. (49° C.) show only small sensitometric changes after four weeks; therefore, the quality for film after four weeks' storage of 120° F. (49° C.) is excellent. The quality of the film deteriorates steadily when the temperature has increased from 120° F. (49° C.) to 160° F. (70° C.) showing a steady decrease in film performance. Film stored at about 160° F. (70° C.) for four weeks produces images considered unacceptable, as film speed decreases, fog levels are high, and the colors are not balanced or bright. The response of color negative films that is cycled through the higher temperature and then back down and then up through the higher temperature corresponds roughly with the failure of continuous high exposure when the cumulative amount of higher treatment is combined. Temperatures of greater than 160° F. (70° C.) are particularly detrimental with four hours a day of 180° F. (82° C.) substantively degrading film in less than four weeks. This applies both to film that has been exposed but not developed, and film that has not been exposed.

The phase change material may be any material that provides protection to film at temperatures greater than 120° F. (49° C.). Therefore, it must have a melting point below or close to this temperature range. Further, it should have a relatively high value of heat of fusion and a high density. The material should exhibit a reversible phase change and not decompose above or below the maximum operating temperature likely to be encountered in the storage case. The phase change material further must be non photoactive and chemically stable in ambient conditions. It is preferably inexpensive, non toxic, and environmentally safe. The principal object of this invention is to provide a case which protects camera and film from transient high temperatures. The invention case also may be used to protec thermally other materials such as pharmaceuticals and food products.

The case is comprised of a thermally insulating shell, a quantity of phase change material inside the shell, a means for encapsulating the phase change material, and a space inside the shell to receive a camera and/or additional rolls of film. The case is low cost, completely passive, requires no external power or connections, and can be used indefinitely.

When the case is placed in a hot environment, such as a car parked in the sun, the thermally insulating shell reduces the rate of heat flow into the interior of the case. When the temperature inside the case reaches the melting point of the phase change material, the phase change material begins to melt, absorbing heat and maintaining the temperature inside the case at the melting point of the phase change material. As the sun goes down and the environment cools, heat is transferred from the case back into the environment, the phase change material resolidifies, and the case returns to its initial state, ready to protect the camera and film during the next day.

The design parameters of the case depend on the expected environmental conditions. Sufficient insulation and phase change material are incorporated into the case to hold the temperature below a maximum allowable limit. This limit is set by the sensitivity of the film to temperature induced degradation. The case for storage in a car located in Maine could be of less thermal protection capability than one for Arizona.

The acceptable melting point (mp) range for the phase change material is from about 70–160° F. (20–70° C.). The lower mp value is determined by the need to reverse the phase change back to the solid state during nighttime hours to prepare the case to protect its contents on the following day. The mp at the lower limit of acceptable mp range must be high enough to ensure such a phase change. The upper mp is determined by the maximum allowable storage temperature to give acceptable image quality over a useful period of time. A small but useful period of time is one week. In some climates, interior automobile temperatures can significantly exceed 160° F. (70° C.) so that some measure of protection and acceptable images may be achieved under such conditions. A preferred range of mp's is 100–140° F. (38–60° C.), and an optimum range is about 110–130° F. (43–55° C.). Setting the mp near the value of the 120° F. (49° C.) as described above keeps film temperature in a safe range and decreases the maximum temperature difference between the case interior and auto interior allowing a thinner insulating wall.

Useful phase change materials for the purposes of the invention can be found among both inorganic and organic materials. Indeed, the single element Gallium, though not a preferred material in terms of performance, would function. Preferred inorganic materials include hydrated mineral salts, e.g., metal nitrates, sulfates, phosphates, silicates, and selenates. Suitable examples of these include $Ca(NO_3)_2.4H_2O$, $Zn(NO_3)_2.6H_2O$, $Na_2SO_4.10H_2O$, $K_2PO_3.4H_2O$, and $Na_2SiO_3.9H_2O$. It is also possible to have mixed cations in the above classes, e.g., $NH_4Fe(SO_4)_2.12H_2O$ or $RbFe(SeO_4)_2.12H_2O$. Other classes include hydrated metal halides, e.g., $CaBr_2.6H_2O$, $FeCl_3.6H_2O$, or $KI_3.1/2H_2O$. Simple binary compounds like $SnBr_4$, $TiBr_4$, and $SeC_2$ are also useful for the purposes of the invention. Combinations of the above compounds with each other and with still other compounds can also be useful with some tuning of melting point possible with combinations which are miscible. For immiscible combinations, combinations can provide multiple phase changes as a function of temperature. Also, combinations can help to provide smaller and more monodisperse crystallite distributions in the solid phase.

Organic compounds useful for the purposes of the invention which meet the phase change selection criteria include waxy substances like simple heavy alkanes and alkenes, such as n-Eicosane, n-Docosane, n-Tricosane, and n-Octadiene. Heavy carboxylic acids such as n-Lauric acid, Elaidic acid, or Myristic acid are also suitable. Certain cyclic alcohols such as Phenol and Menthol are also useful for the purposes of the invention. Esters like Methyl Cinnamate, Dimethyl Tartrate, and Methyl Oxalate are yet another useful group. Amines like α-Napthylamine and 4-aminotoluene can also satisfy the selection requirements. Certain halogenated compounds, for example, m-Xylenedichloride and 2,2,2-trichloro-1,1-ethanediol are also useful. The above organic compounds have been identified as being especially useful, but any organic compound that meets the selection criteria outlined above would be applicable.

Metallo-organic compounds such as certain metal-carboxylates and metal-alkoxides are also useful for the invention, though the latter tend to be somewhat unstable in ambient conditions. Several natural fats and waxes are also applicable as phase change materials for the purposes of the invention.

The phase change discussed above and in the invention disclosure concerns the solid-liquid transition. Though the above is preferred, the use of the liquid-gas transition is also applicable to the present invention.

Preferred materials for the invention are those listed below:

| Name | Formula | Melt Point ° C. | (Heat of fusion) × (density) Cal/cm³ |
|---|---|---|---|
| Methyl oxalate | $C_4H_6O_4$ | 54 | 49 |
| 9 Octadecanoic acid | $C_{18}H_{34}O_2$ | 44.4 | 45.5 |
| Myristic acid | $C_{14}H_{28}O_2$ | 54 | 47.5 |
| Sodium sulfate decahydrate | $Na_2SO_4\text{-}10H_2O$ | 32.4 | 83.4 |
| Calcium nitrate tetrahydrate | $Ca(NO_3)_2\text{-}4H_2O$ | 42.6 | 64.4 |

Another preferred material has been found to be sodium thiosulfate pentahydrate, as it is low in cost and has a melting temperature at 120° F. (49° C.) with a relatively high heat of fusion of 48 calories per gram.

Generally, the containers of the invention are provided with an insulating outer cover to increase the range of their effectiveness. The insulating cover may be of any suitable material that is low in cost, highly insulating, and safe. Any of the foam plastics may be utilized. Typical of such materials are foam urethanes and epoxys. A preferred material is polystyrene foam, particularly about ½ inch of this material is satisfactory. Such material will have a thermal conductivity at 0.02 watt per meter. Generally, it is desired that the insulating cover has a thermal conductivity of less than 0.03 watt per meter in order to be effective as a camera case for use in a car. A soft insulation such as polyester fibers is used in clothing, picnic, and lunch bags also could be utilized.

The surface of the container could be covered with a material to decorate the insulating material. Typical of such materials would be cardboard, plastic sheets, or cloth. The surface may be printed.

The following examples illustrate the practice of this invention. They are not intended to be exhaustive of all possible variations of the invention. Parts and percentages are by weight unless otherwise indicated.

EXAMPLES

Example 1

A 0.5 inch thick Styrofoam case was constructed which could contain a single use camera. The surface area of the box was 55 square inches, and the thermal conductivity estimated at 0.02 watt per meter. A sealed bag containing 121 gm of sodium thiosulfate pentahydrate, having a melting temperature of 120° F. (49° C.) and a heat of fusion of 48 cal/gm was placed inside the case. The case was then subjected to a temperature profile of a 4-hour ramp from 70 to 180° F. (21–82° C.), hold at 4 hours at 180° F. (82° C.), a 4 hour ramp back to 70° F. (21° C.) and then 12 hours at 70° F. (21° C.). This profile approximates the thermal conditions inside a car parked outside in the southwestern United States.

Figure 3:
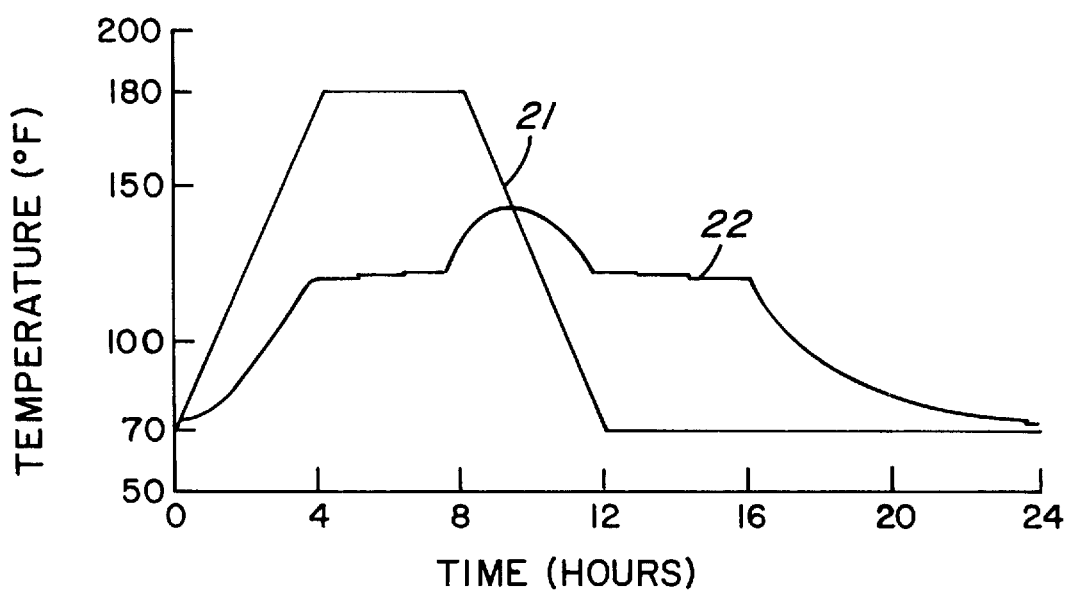
FIGS. 3–6 graphically illustrate the performance of containers described in the Examples.

FIG. 3 shows the theoretical temperatures inside and outside the case. Curve 21 is the temperature outside of the case, and curve 22 is the temperature inside the case. After four hours the phase change material begins to melt, holding the temperature at the melting point. Just before eight hours has passed, all the phase change material is melted and the temperature begins to rise above the melting temperature. When eight hours have passed, the car interior begins to cool. The maximum temperature seen by the film is only 140° F. (60° C.), even though the car was at 180° F. (82° C.) for four hours. During the remainder of the 24-hour period, the phase change material solidifies at the melting temperature and then cools. After 24 hours have passed, the case has returned to the previous initial conditions and is ready for another day of use.

Figure 4:
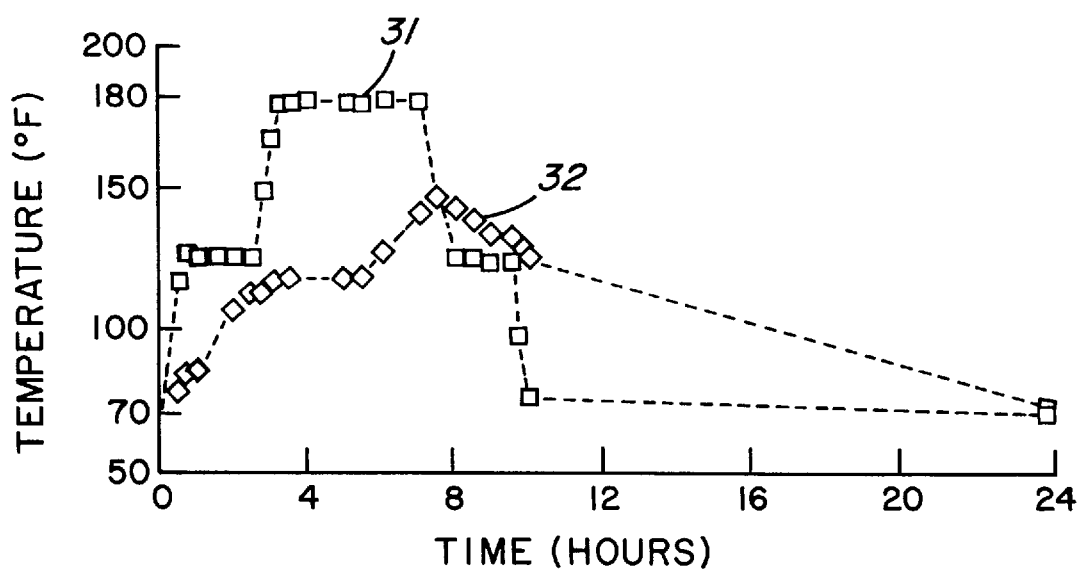

FIG. 4 shows experimental data, using the same parameters as the theoretical model above, with the exception that the input temperature profile used was not a smooth ramp due to equipment limitations. Curve 31 is the environmental chamber temperature, and curve 32 is the temperature inside the case. The results closely match those of the calculated theoretical model.

Example 2

Figure 5:
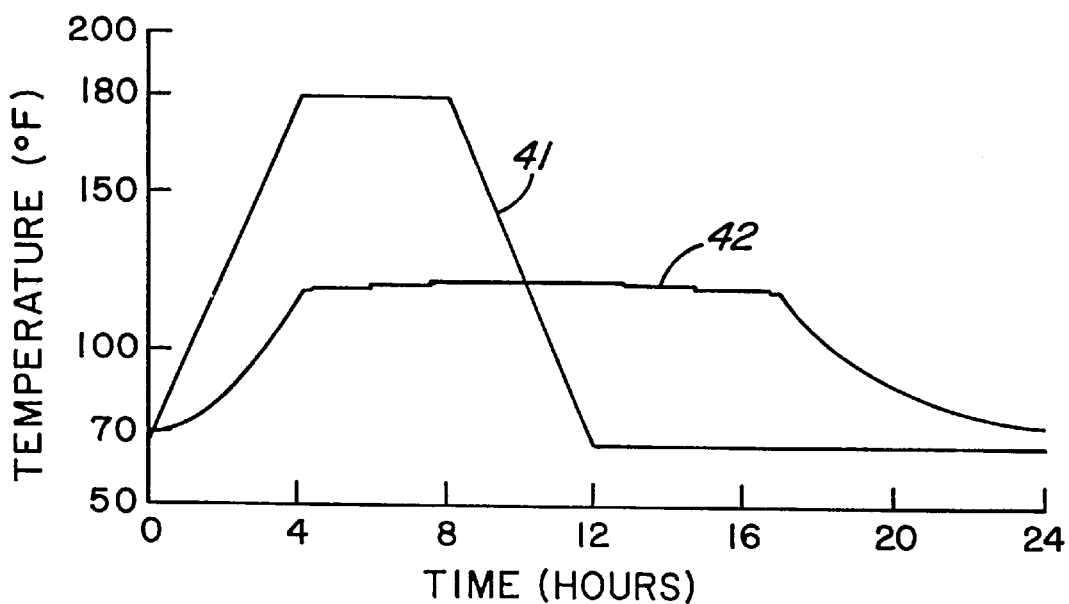

Using all the same parameters as in Example 1, except this time the thickness of the Styrofoam case is increased to 0.65 inch thick. FIG. 5 shows the theoretical temperature profiles. Curve 41 is the temperature outside of the case, and curve 42 is the temperature inside the case. The added insulation decreases the flow of heat into the case. The phase change material does not all melt, and the temperature inside the case does not exceed the melting point of the phase change material.

Example 3

Figure 6:
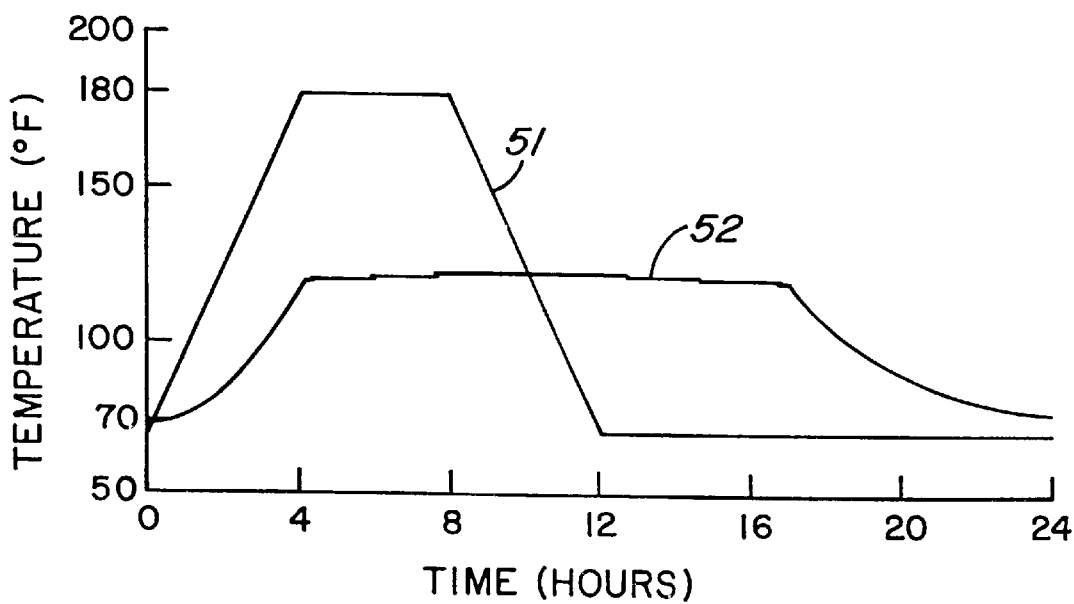

Using all the same parameters as in Example 1, except this time the quantity of sodium thiosulfate pentahydrate is increased to 160 gm. FIG. 6 shows the theoretical temperature profiles. Curve 51 is the temperature outside of the case, and curve 52 is the temperature inside the case. The added material absorbs a larger quantity of heat. With this quantity, all the phase change material does not melt, and the temperature inside the case does not exceed the melting point temperature.

The invention has been described in detail with particular reference to certain preferred embodiments thereof, but it will be understood that variations and modifications can be effected within the spirit and scope of the invention.

What is claimed is:

1. A method of storing film in a car comprising placing said film in a container comprising an outer thermal insulating shell, a phase change material inside said shell, repeatedly cycling over a 24-hour period reaching 180° F. (82° C.) for up to four hours and a temperature below 110° F. (43° C.) to 130° F. (55° C.) for a period sufficient to allow the phase change material to revert entirely to a phase exhibited by said phase change material below its phase change temperature, wherein said container will maintain an internal temperature of less than 130° F. (55° C.) when cycled over a 24-hour period including up to four hours at 180° F. (82° C.), and wherein said phase change material changes phase between 110° F. (43° C.) and 130° F. (55° C.).

2. The method of claim 1 wherein said phase change material comprises sodium sulfate decahydrate.

3. The method of claim 2 wherein said container has a storage volume of up to 36 cubic inches and said phase change material is present in an amount of up between 110 and 150 grams.

4. The method of claim 1 wherein said insulating shell has a thermal conductivity of less than 0.025 watt/m$^2$.

5. The method of claim 1 wherein said phase change material is selected from the group consisting of methyl oxalate, 9-octadecanoic acid, myristic acid, sodium sulfate decahydrate, and calcium nitrate tetrahydrate.

6. The method of claim 3 wherein said thermal insulating material comprises polystyrene foam.

7. The method of claim 1 wherein said phase change material is selected from the group consisting of hydrated mineral salts, hydrated metal halides, heavy alkanes, heavy alkenes, heavy carboxylic acids, and cyclic alcohols.

8. An article comprising photographic silver halide film surrounded by a container comprised of (a) an inner wall structure comprised of a phase change material and (b) an outer wall structure comprised of a thermally insulating material, the phase change material being selected to undergo a phase change at a temperature between 110° F. (43° C.) and 130° F. (55° C.) and the phase change and thermally insulating materials being provided in an amount sufficient to maintain said film at a temperature below 130° F. (55° C.) when said container is repeatedly cycled over a 24 hour period above 180° F. (82° C.) for four hours and below the phase change temperature for a period sufficient to allow the phase change material to revert entirely to a phase exhibited by the phase change material below its phase change temperature.

9. The article of claim 8 wherein said phase change material comprises sodium sulfate decahydrate.

10. The article of claim 9 wherein said container has a storage volume of up to 36 cubic inches and said phase change material is present in an amount of up between 110 and 150 grams.

11. The article of claim 8 wherein said insulating shell has a thermal conductivity of less than 0.025 watt/m$^2$.

12. The article of claim 8 wherein said phase change material is selected from the group consisting of methyl oxalate, 9-octadecanoic acid, myristic acid, sodium sulfate decahydrate, and calcium nitrate tetrahydrate.

13. The article of claim 10 wherein said thermal insulating material comprises polystyrene foam.

14. The article of claim 8 wherein said phase change material is selected from the group consisting of hydrated mineral salts, hydrated metal halides, heavy alkanes, heavy alkenes, heavy carboxylic acids, and cyclic alcohols.

* * * * *